(12) United States Patent
Miyanabe et al.

(10) Patent No.: US 6,657,939 B2
(45) Date of Patent: Dec. 2, 2003

(54) SIGNAL DELAY APPARATUS, LEAKAGE SIGNAL REMOVING APPARATUS AND INFORMATION PROCESSING APPARATUS

(75) Inventors: Shogo Miyanabe, Tsurugashima (JP); Hiroki Kuribayashi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 154 days.

(21) Appl. No.: 09/955,117

(22) Filed: Sep. 19, 2001

(65) Prior Publication Data

US 2002/0034150 A1 Mar. 21, 2002

(30) Foreign Application Priority Data

Sep. 19, 2000 (JP) ..................................... P2000-284220

(51) Int. Cl.[7] ............................................... G11B 7/00
(52) U.S. Cl. ................. 369/60.01; 369/59.22; 369/124.07
(58) Field of Search ..................... 369/47.1, 47.5, 369/47.18, 47.19, 53.1, 59.1, 59.12, 59.13, 59.15, 59.21, 59.22, 59.23, 59.27, 60.01, 124.01, 124.02, 124.06, 124.07, 124.14

(56) References Cited

U.S. PATENT DOCUMENTS 5,666,339 A * 9/1997 Honguh .................. 369/124.13
5,848,045 A * 12/1998 Kirino et al. ............. 369/47.53

\* cited by examiner

*Primary Examiner*—Muhammad Edun
(74) *Attorney, Agent, or Firm*—Morgan, Lewis & Bockius LLP

(57) ABSTRACT

A signal delay apparatus is provided with; a FIR filter for detecting a leakage signal, which is mixed in a digital detected signal, which is optically obtained from a main truck to be detected in association with the information recorded on a sub truck adjacent to the main truck to be detected, based n a filter coefficient; a coefficient setting unit for generating the above filter coefficient based on the digital detected signal, of which leakage signal is removed, and a digital detected signal, and outputting the generated filter coefficient to the filter; a CPU for controlling the delay amount in the delay with respect to any filter coefficient based on the change of the filter coefficient, which is generated in a predetermined time period and variable delay circuits and for delaying the digital detected signal and the digital detected signal by the controlled delay amount.

10 Claims, 7 Drawing Sheets

| COMPLEMENT INDICATION OF 2 | | STRAIGHT INDICATION | | CONTENT OF Svd₁ |
|---|---|---|---|---|
| CONTENT OF Scd₁ | BIT INDICATION | CONTENT OF Scd₁ | BIT INDICATION | |
| 3 | (0 1 1) | 7 | (1 1 1) | Sr8 |
| 2 | (0 1 0) | 6 | (1 1 0) | Sr7 |
| 1 | (0 0 1) | 5 | (1 0 1) | Sr6 |
| 0 | (0 0 0) | 4 | (1 0 0) | Sr5 |
| −1 | (1 1 1) | 3 | (0 1 1) | Sr4 |
| −2 | (1 1 0) | 2 | (0 1 0) | Sr3 |
| −3 | (1 0 1) | 1 | (0 0 1) | Sr2 |
| −4 | (1 0 0) | 0 | (0 0 0) | Sr1 |

US 6,657,939 B2

SIGNAL DELAY APPARATUS, LEAKAGE SIGNAL REMOVING APPARATUS AND INFORMATION PROCESSING APPARATUS

BACKGROUND OF THE INVENTION

1. Field of the Invention

The present invention relates to a technical field of a signal delay apparatus, a leakage signal removing apparatus and an information processing apparatus. More specifically, the present invention relates to a technical field of a signal delay apparatus for controlling delay amounts of detected signals, which are obtained from a plurality of tracks formed on a recording medium, respectively, a leakage signal removing apparatus including the forgoing signal delay apparatus for removing a leakage signal caused by the detected signals of other trucks from any detected signal and an information processing apparatus including the leakage signal removing apparatus.

2. Description of the Related Art

Conventionally, in the case that the information is detected from the truck formed on the recording medium such as an optical disk or the like, an optical beam is irradiated to this truck and this information is detected on the basis of the reflected light of this optical beam from the track.

On one hand, in recent years, narrowing of truck pitch (namely, narrowing of spacing between the trucks, which are adjacently formed) in the trucks on the recording medium is noticeable at the request of improvement of the recording density. However, in this case, if the optical beam is irradiated to the truck, in which the information to be detected is recorded, a portion of a light spot formed by that optical beam on the recording medium is also irradiated on the truck adjoining the truck to be irradiated (namely, the truck which should not be originally irradiated by the optical beam). As a result, there was a case such that the information recorded in that adjoining truck was leaked in its reflection light as so-called cross talk (a leakage signal).

Therefore, conventionally, the above optical beam is divided into three on a flat surface by using a diffraction grating or the like. Then, a central one of them (hereinafter, referred to as a main beam) is irradiated toward the truck to be originally irradiated and other two beams (hereinafter, referred to as a sub beam, respectively) are irradiated to the two trucks adjoining the both sides of the truck to be originally irradiated, respectively. After that, two detected signals to be obtained from the reflection light of the sub beam are subtracted from the detected signals obtained from the reflection light of the main beam, so that the above described cross talk component, which is included in the detected signal obtained from the reflection light of the main beam, is deleted.

In the above case, according to the conventional cross talk deleting system, the main beam and two sub beams are generated by the diffraction grating or the like, so that a line connecting an irradiation center point of respective beams on the recording medium was not orthogonal to a moving direction of respective trucks.

Therefore, according to the conventional leakage signal removing system, the detected signals obtained from the reflection light of one of the sub beams and the detected signals obtained from the reflection light of the main beam are delayed by fixed times, which are different each other. Then, after orthogonalizing the line connecting the irradiation center points of respective beams and the moving direction of respective trucks for processing the signals (i.e., apparently), the two detected signals obtained from the reflection light of the sub beam are subtracted from the detected signals obtained from the reflection light of the main beam, respectively, so as to remove the above described cross talk.

However, according to the above described tendency of narrowing of truck pitch, the spacing between the above main beam and respective sub beams is also apt to be narrowed. Therefore, it is necessary to fix the spacing more exactly and remove the cross talk. On the contrary, if the oscillation wavelength of the semiconductor laser serving as an ejection source of respective optical beams is changed because of alteration of an ambient temperature or the like, the separation condition by the diffraction grating is changed. As a result, the spacing between the main beam and the sub beams subjects to be changed.

In this case, if this spacing is changed, originally, it is necessary to change the delay amount of respective detected signals depending on the change of the spacing. However, as described above, conventionally, the delay amount is always fixed for respective detected signals, so that this involves a problem such that it is not possible to obtain an appropriate delay amount for orthgonalizing the line connecting the irradiation center point of respective beams and the moving direction of respective trucks for processing the signals in response to the oscillation wavelength of the optical beam.

Further, this problem leads to a problem such that it is not possible to appropriately remove the cross talk and the detected signal is generated as the noise by the cross talk remains in the detected signal in association with the information to be detected, so that the information by the use of this detected signal can not be accurately recorded or reproduced.

SUMMARY OF THE INVENTION

The present invention has been made taking the present problems Into consideration, an object of which is to provide a signal delay apparatus capable of calculating an accurate signal delay amount for removing the cross talk even in the case that the irradiation manner of the optical beam such as the beam spacing or the like is changed, a leakage signal removing apparatus capable of more accurately removing the cross talk and further, an information processing apparatus capable of accurately performing the information processing such as recording or playing or the like by the use of the detected signal, from which the cross talk is accurately removed.

The above object of the present invention can be achieved by a signal delay apparatus of the present invention for delaying at least one of a main detected signal, which is optically obtained from a main truck, in which the information to be detected is recorded, or a sub detected signal, which is optically obtained from a sub truck other than the main truck. The apparatus is provided with: a filter device for generating a leakage signal, which is mixed in the main detected signal in association with the information, which is recorded on the sub truck, on the basis of a filter coefficient; a coefficient setting device for generating the filter coefficient on the basis of the main detected signal, of which the leakage signal is removed, and the sub detected signal, and for outputting the generated filter coefficient to the filter device: a delay amount controlling device for controlling the delay amount in the delay of any one of the main detected signal and the sub detected signal on the basis of the change in the filter coefficient, which is generated in a predetermined time period; and a delay device for delaying any one of the main detected signal and the sub detected signal by the controlled delay amount.

According to the present invention, on the basis of the change of a plurality of filter coefficients, the delay amount of respective detected signals is controlled, so that, even if the irradiation manner of the optical beam to be irradiated to respective trucks is changed, it is possible to delay respective detected signals by accurately controlling the delay amount.

In one aspect of the present invention, the signal delay apparatus is provided with a plurality of filter devices for generating the plural leakage signals, which are mixed in the main detected signal, respectively, in association with the information, which are recorded on a plurality of and different sub trucks, respectively, on the basis of the filter coefficient. Further, the coefficient setting device generates the respective filter coefficients, respectively, on the basis of the main detected signal, of which the respective leakage signals are removed, respectively, and a plurality of sub detected signals in association with the respective sub trucks, and outputting generated filter coefficients to the corresponding filter device. Moreover, the delay amount controlling device controls the delay amount in the delay of any one of the main detected signal and the sub detected signal on the basis of the change in the respective filter coefficients, which are generated in the time period with respect to the plural sub trucks.

According to this aspect, on the basis of the change of a plurality of filter coefficients in association with a plurality of sub trucks, the delay amount of respective detected signals is controlled, so that, even if the irradiation manner of the optical beam to be irradiated to respective trucks is changed, it s possible to delay respective detected signals by more accurately controlling the delay amount.

In another aspect of the present invention, the filter device is a digital filter device for digitally detecting the leakage signal. Further, the digital filter device is further provided with: a difference calculating device for calculating the difference between a plurality of tap coefficients; and the delay amount controlling device controls the delay amount on the basis of the calculated difference.

According to this aspect, the delay amount of respective detected signals is controlled on the basis of the difference between a plurality of tap coefficients in a digital filter device, so that It is possible to accurately control the delay amount with a simple structure.

In further aspect of the present invention, the difference calculating device calculates the difference between the Nth (N is a natural numeral) tap coefficient and the −Nth tap coefficient. Further, the delay amount controlling device controls the delay amount on the basis of the calculated difference.

According to this aspect, on the basis of the difference between the tap coefficients, which are symmetrical to a time axis, the delay amount is controlled, so that it is possible to accurately control the delay amount.

In further aspect of the present invention, the difference calculating device is provided with: a first calculating device for calculating a first difference, which is a difference between the Nth (N is a natural numeral) tap coefficient and the −Nth tap coefficient; a second calculating device for calculating a second difference, which is a difference between the Mth (M is a natural numeral and M is not equal to N) tap coefficient and the −Mth tap coefficient. Further, the delay amount controlling device controls the delay amount on the basis of sum of the first difference and the second difference.

According to this aspect, on the basis of a value obtained by adding two sets of the difference between the tap coefficients, which are symmetrical to a time axis, the delay amount is controlled, so that an error of the delay amount is detected in a wide range and it is possible to accurately control the delay amount.

In further aspect of the present invention, the difference calculating device calculates a difference between the Nth (N is a natural numeral) tap coefficient and the −Nth tap coefficient Further, the delay amount controlling device controls the delay amount on the basis of a value obtained by adding the calculated difference to a predetermined number of the tap coefficients.

According to this aspect, on the basis of a value obtained by adding a plurality of the differences between the tap coefficients, which are symmetrical to a time axis, the delay amount is controlled, so that it is possible to more accurately control the delay amount.

In further aspect of the present invention, the filter device is provided with a digital filter device for digitally detecting the leakage signal. Further, the delay amount controlling device is provided with: a multiplying device for multiplying respective tap coefficients in the digital filter device with a lapsed time from a predetermined standard time at a sample timing in association with the respective tap coefficients and for calculating the multiplied values, respectively; and an adding device for adding the multiplied values, which are calculated for the all tap coefficients, and for calculating added values. Moreover, the delay amount controlling device controls the delay amount on the basis of the calculated added value.

According to this aspect, on the basis of a value obtained by adding the value obtained by multiplying respective tap coefficients by a lapsed time from a standard time at a sampling timing in association with the respective tap coefficients to all tap coefficients, the delay amount is controlled, so that it is possible to more accurately control the delay amount.

In further aspect of the present invention, the digital filter device is provided with a FIR (Finite Impulse Response) filter.

According to this aspect, it is possible to more accurately control the delay amount.

The above object of the present invention can be achieved by a leakage signal removing apparatus of the present invention for removing a leakage signal from a main detected signal by using detected signals, which are delayed by a delaying device in a signal delay apparatus for delaying at least one of the main detected signal, which is optically obtained from a main truck, in which the information to be detected is recorded, or a sub detected signal, which is optically obtained from a sub truck other than the main truck. The signal delay apparatus is provided with: a filter device for generating a leakage signal, which is mixed in the main detected signal in association with the information, which is recorded on the sub truck, on the basis of a filter coefficient; a coefficient setting device for generating the filter coefficient on the basis of the main detected signal, of which the leakage signal is removed, and the sub detected signal, and for outputting the generated filter coefficient to the filter device; a delay amount controlling device for controlling the delay amount in the delay of any one of the main detected signal and the sub detected signal on the basis of the change in the filter coefficient, which is generated in a predetermined time period; and a delay device for delaying any one of the main detected signal and the sub detected signal by the controlled delay amount.

According to the present invention, it is possible to remove the leakage signal (cross talk) in the main detected signals.

The above object of the present invention can be achieved by a information processing apparatus of the present invention. The apparatus is provided with: (i) a leakage signal removing apparatus for removing a leakage signal from a main detected signal by using detected signals, which are delayed by a delaying device in a signal delay apparatus for delaying at least one of the main detected signal, which is optically obtained from a main truck, in which the information to be detected is recorded, or a sub detected signal, which is optically obtained from a sub truck other than the main truck, the signal delay apparatus is provided with: a filter device for generating a leakage signal, which is mixed in the main detected signal in association with the information, which is recorded on the sub truck, on the basis of a filter coefficient; a coefficient setting device for generating the filter coefficient on the basis of the main detected signal, of which the leakage signal is removed, and the sub detected signal and for outputting the generated filter coefficient to the filter device; a delay amount controlling device for controlling the delay amount in the delay of any one of the main detected signal and the sub detected signal on the basis of the change in the filter coefficient, which is generated in a predetermined time period; and a delay device for delaying any one of the main detected signal and the sub detected signal by the controlled delay amount, and (ii) a processing device for performing at least one of recording the information in the main truck on the basis of the main detected signal, of which the leakage signal is removed, or playing the information.

Therefore, it is possible to accurately perform any one of recording or playing by the used of the main detected signals, from which the leakage signals are accurately removed.

DESCRIPTION OF THE PREFERRED EMBODIMENTS (I) An Embodiment

Next, an embodiment preferable for the present invention will be explained with reference to FIGS. 1 to 6.

In the embodiment to be described below, the present invention is applied to an information reproducing apparatus. In the information reproducing apparatus, one main beam is irradiated to a truck, in which the information to be read is recorded hereinafter, this truck is referred to as a main truck), if only a portion of a truck formed on an optical disk in a helical configuration is seen. Further, the sub beams are irradiated one by one to two sub trucks, which are adjacently formed on the both sides of the main truck, respectively. Moreover, the detected signals generated by receiving the reflection light of respective sub beams, which are obtained from the optical disk, are subtracted from the main detected signals, which are generated by receiving the reflection light of the main beam, respectively. Then, the information reproducing apparatus removes the cross talk included in the main detected signal caused by reason that the edge of the main beam is included with the sub trucks and reproduces the necessary information.

Figure 1:
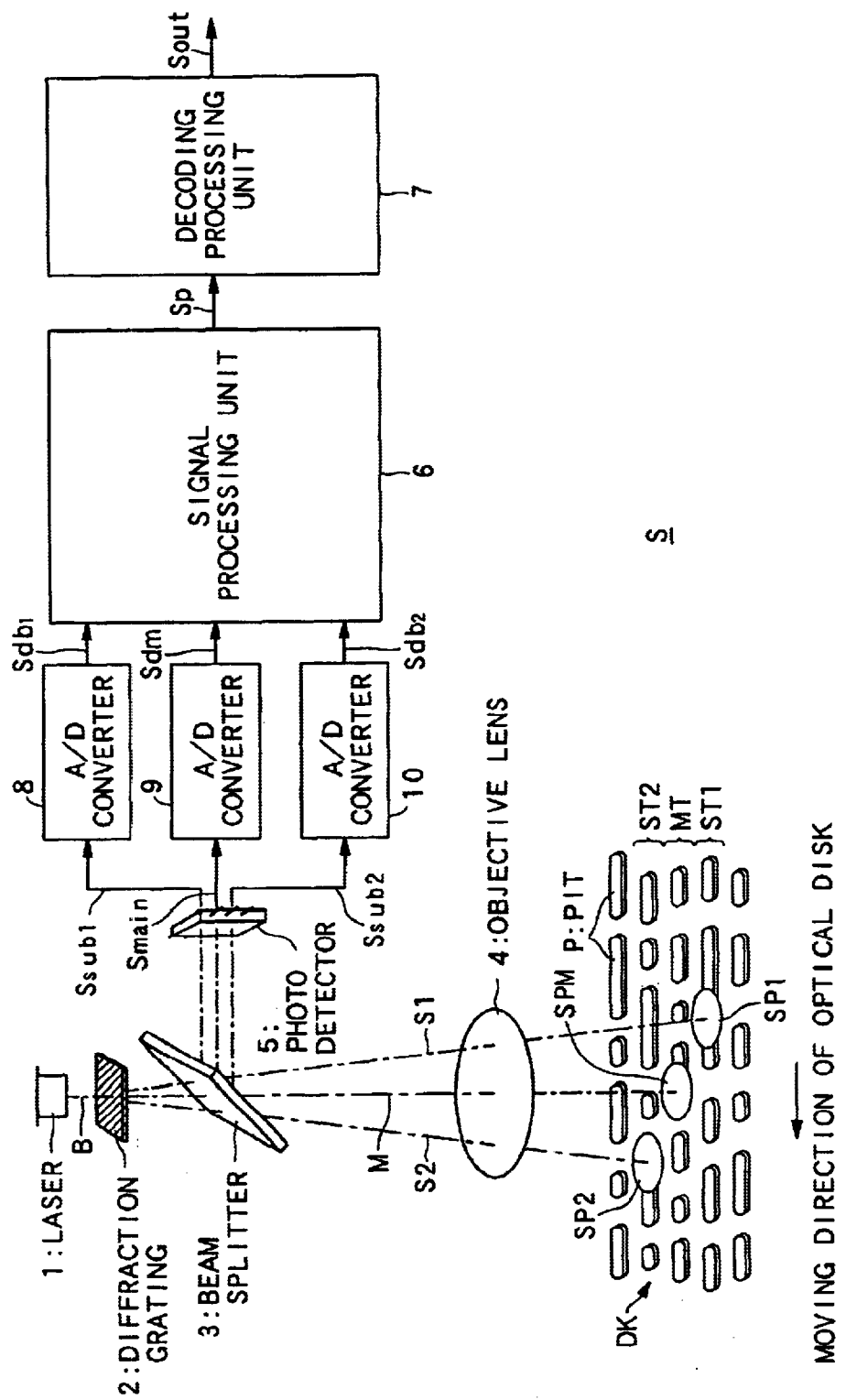
FIG. 1 is a block diagram for illustrating a schematic structure of an information reproducing apparatus according to an embodiment of the present invention.
Figure 2:
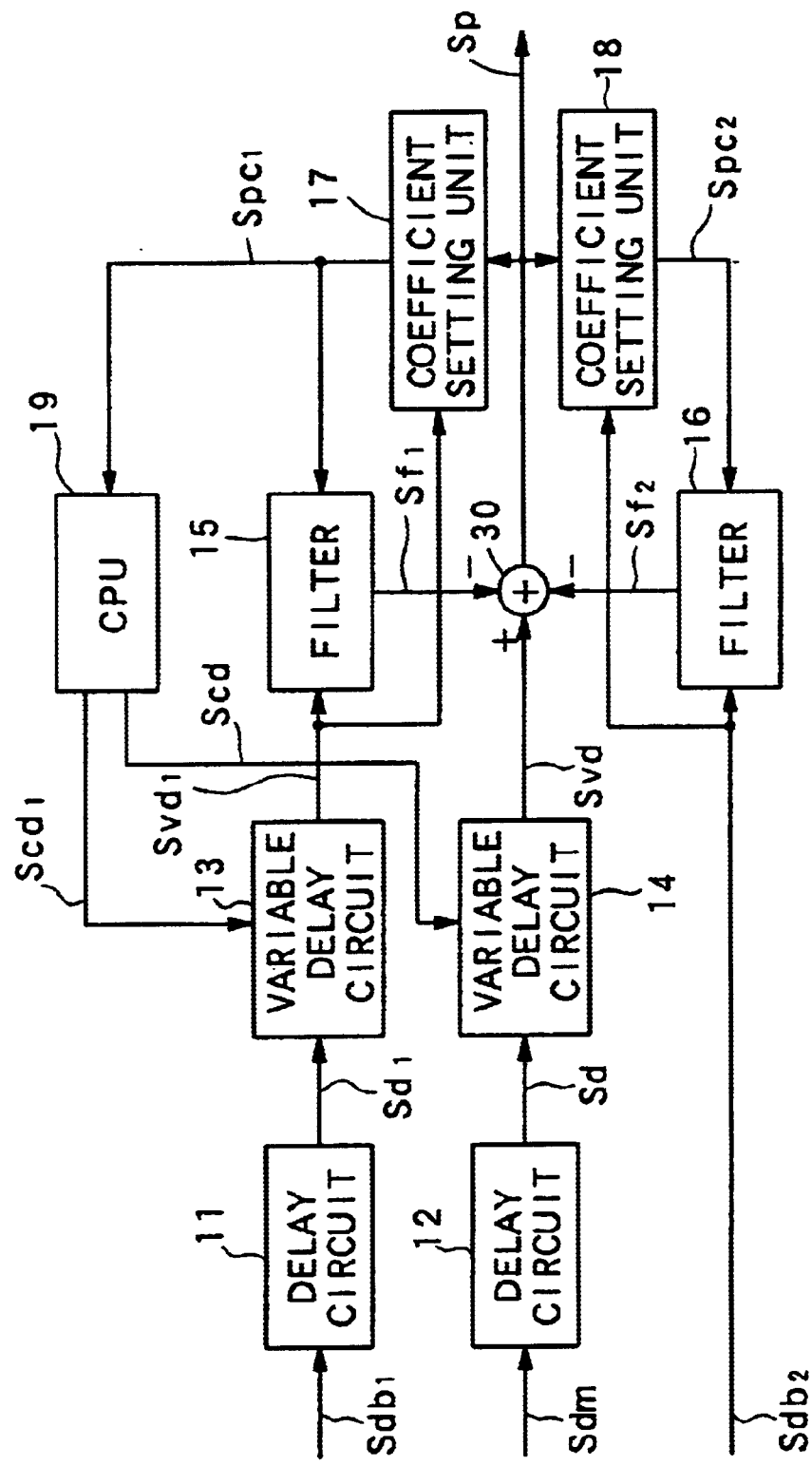
FIG. 2 is a block diagram for illustrating a schematic structure of a signal processing unit according to the embodiment of the present invention.
Figures 3A, 3B:
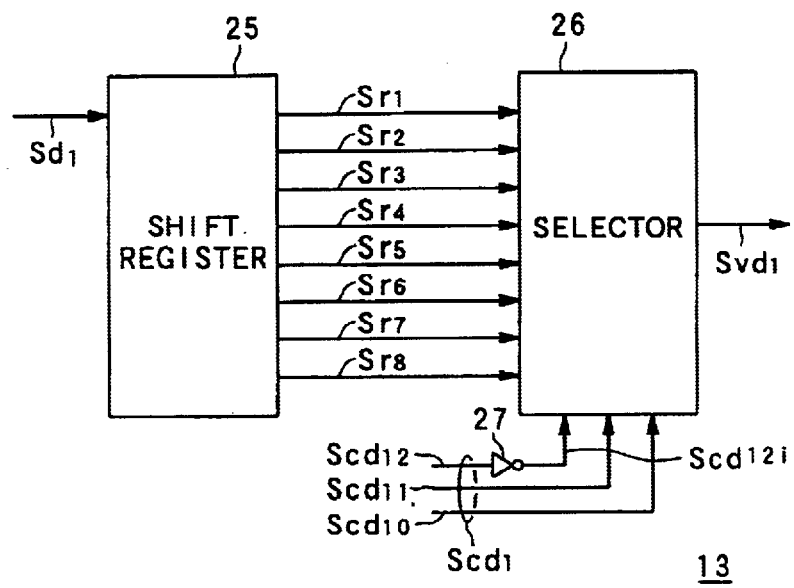
FIG. 3 is a block diagram for illustrating a schematic structure of a variable delay circuit according to the embodiment of the present invention.
Figure 4:
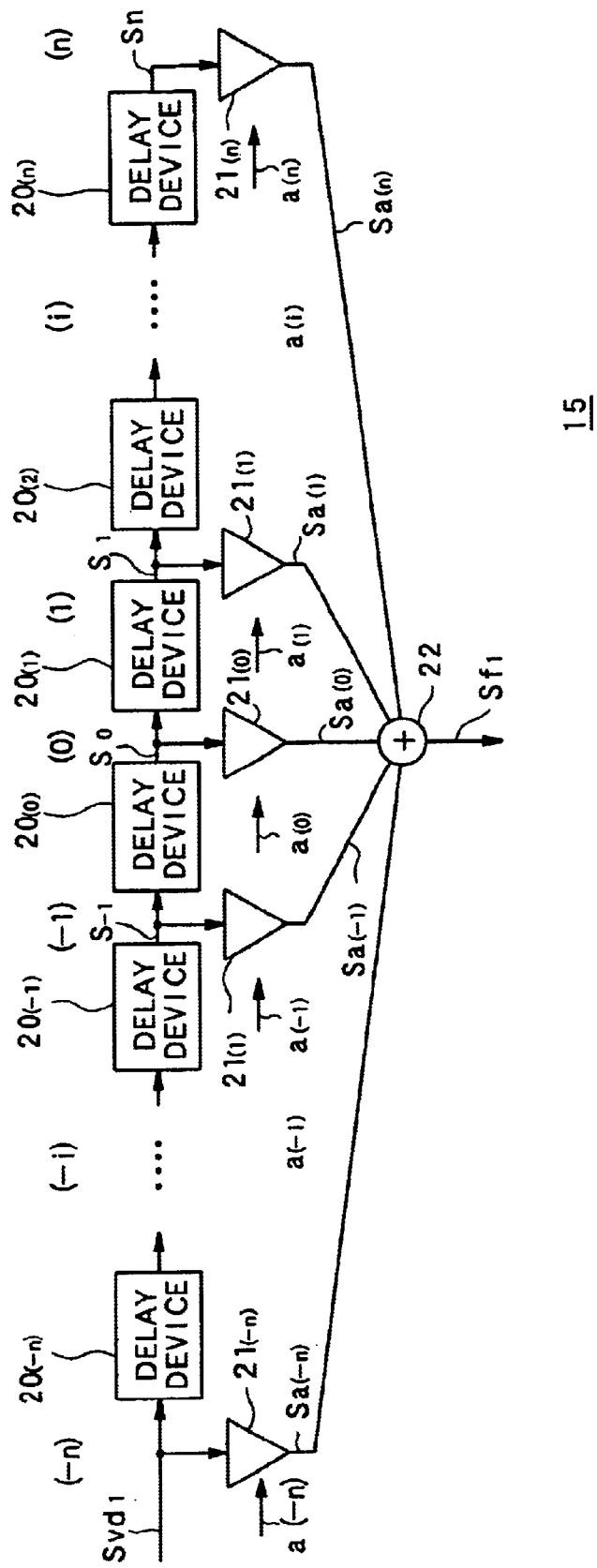
FIG. 4 is a block diagram for illustrating a schematic structure of a filter according to the embodiment of the present invention.
Figure 5:
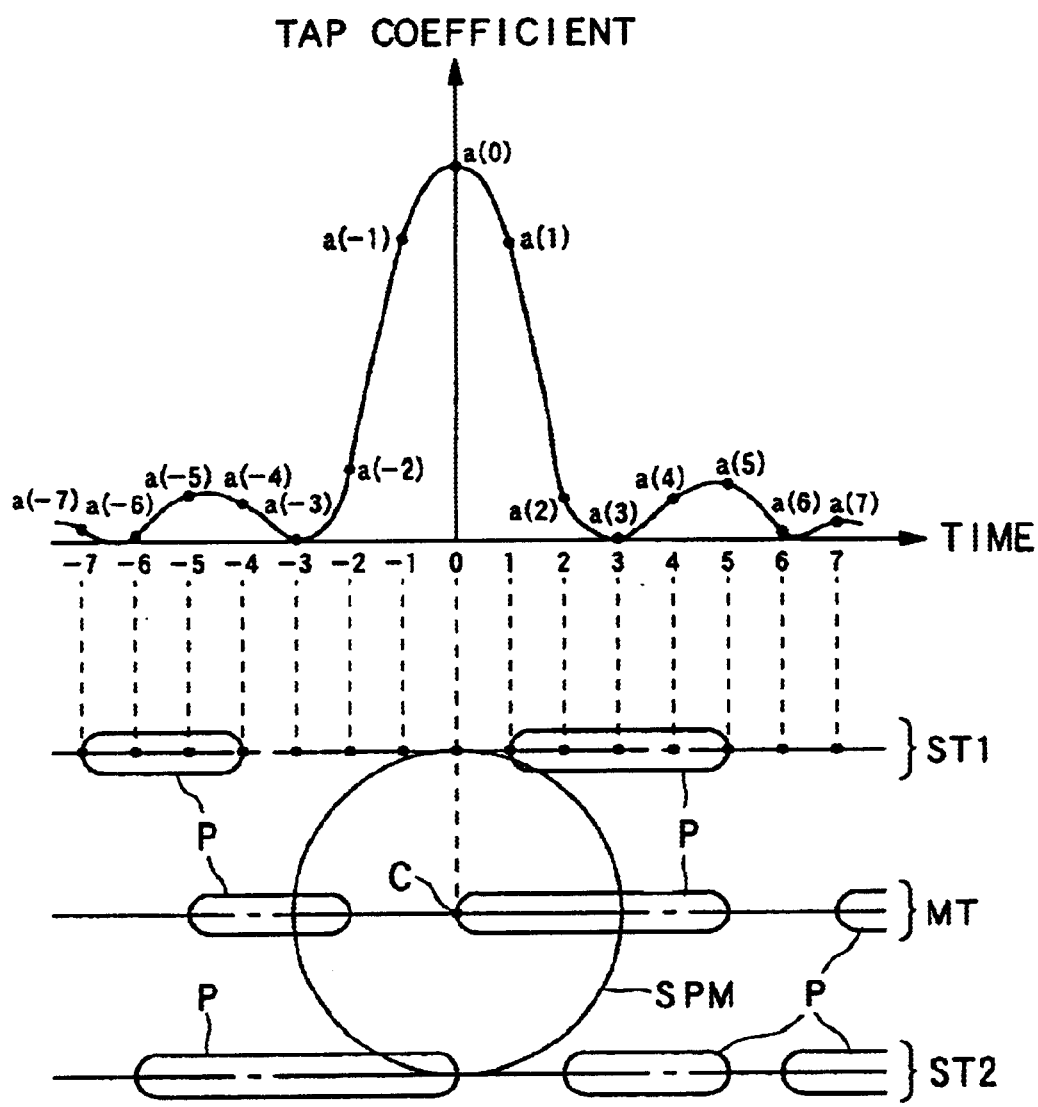
FIG. 5 is a diagram for illustrating the operation of the filter according to the embodiment of the present invention.
Figure 6:
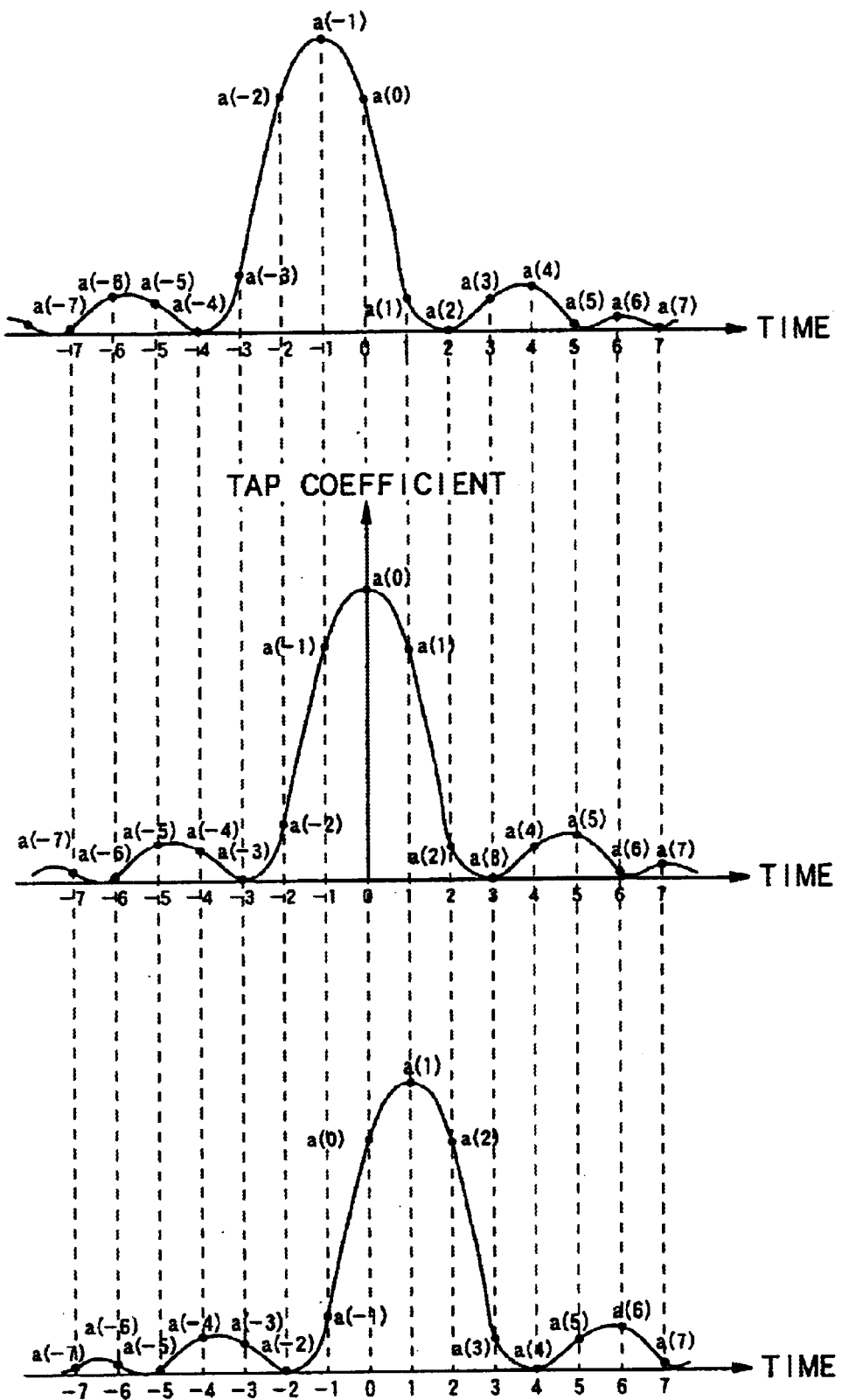
FIG. 6 is a diagram for illustrating the processing for controlling a delay amount according to the embodiment of the present invention.

FIG. 1 is a block diagram for illustrating a schematic structure of an information playing apparatus according to an embodiment of the present invention, FIG. 2 is a block diagram for illustrating a schematic structure of a signal processing unit according to an embodiment of the present invention, FIG. 3 is a block diagram for illustrating a schematic structure of a variable delay circuit according to an embodiment of the present invention, FIG. 4 is a block diagram for illustrating a schematic structure of a filter according to an embodiment of the present invention, FIG. 5 is a diagram for illustrating the operation of the filter according to an embodiment of the present invention and FIG. 6 is a diagram for illustrating the processing for controlling a delay amount according to an embodiment of the present invention.

At first, by using FIG. 1, the schematic structure and the operation of the information reproducing apparatus according to the embodiment will be explained below.

As shown in FIG. 1, the information reproducing apparatus S for reproducing the information, which is recorded on an optical disk DK by a pit P having plural kinds of lengths, as removing the above described cross talk by simultaneously irradiating three optical beams is comprised of: a laser 1, a diffraction grating 2, a beam splitter 3, an objective lens 4, a photo detector 5, a signal processing unit 6, a decoding processing unit 7 as a processing device and A/D (Analog/Digital) converters 8 to 10.

Next, the operations of respective parts will be explained.

At first, the laser 1 generates an optical beam B for reproducing the information having a fixed strength, which is set in advance, and irradiates it to the diffraction grating 2.

Then the diffraction grating 2 separates the optical beam B into a maim beam M to be irradiated to a main truck MT, in which the information to be reproduced is recorded, and sub beams S1 and S2 to be respectively irradiated to sub trucks ST1 and ST2, which are adjacently formed on the both sides of the main truck MT, then, the diffraction grating 2 irradiates them to the beam splitter 3, respectively.

Next, the separated main beam M and the sub beams S1 and S2 are permeated through the beam splitter 3, then, the beam splitter 3 irradiates them to the objective lens 4.

Therefore, the objective lens 4 condenses the irradiated main beam M and the sub beams S1 and S2, respectively. Then, the objective lens 4 irradiates the main beam M to the main truck MT, irradiates the sub beam S1 to the sub truck ST1 and irradiates the sub beam 52 to the sub truck ST2, respectively. In this time, an optical spot SPM by the main beam M is formed on an irradiation position on the main truck MT, an optical spot SP1 by the sub beam S1 is formed on an irradiation position on the sub truck ST1 and an optical spot SP2 by the sub beam S2 is formed on an irradiation position on the sub truck ST2. In this case, a separation angle of respective optical beams in the diffraction grating 2 are adjusted so that the optical spots SPM, SP1 and SP2 are arranged in alignment.

Next, the reflection light from respective optical disks DK of the main beam M, the sub beam S1 and the sub beam S2 is condensed by the beam splitter 3 via a backlight path of the original main beam M, the sub beam S1 and the sub beam S2. In this case, by the reflection from the optical disk DK, faces of polarization of the reflection lights of the main beam M, the sub beam S1 and the sub beam S2, respectively, are rotated by a slight angle.

Therefore, the beam splitter 3 reflects the reflection lights, of which faces of polarization are rotated, respectively, in turn and separately irradiates these reflection lights to the photo detector 5 for each reflection light.

Then, the photo detector 5 separately receives the three reflection lights, respectively, and generates the corresponding three detected signals Smain, Ssub1 and Ssub2 to output them separately to the A/D converters 8 to 10, respectively. In this time, the detected signal Smain corresponds to the reflection light of the main beam M, the detected signal Ssub1 corresponds to the reflection light of the sub beam S1 and the detected signal Ssub2 corresponds to the reflection light of the sub beam S2.

After that, respective A/D converters 8 to 10 digitizes the detected signals Smain, Ssub1 and Ssub2, respectively, and generates digital detected signals Sdm, Sdb1 and Sdb2, respectively, to separately output them to the signal processing unit 6.

Next, the signal processing unit 6 removes the cross talk, which is included in the digital detected signal Sdm by using the digital detected signals Sdm, Sdb1 and Sdb2. Then, the signal processing unit 6 generates a removing signal Sp to output it to the decoding processing unit 7.

Further, the decoding processing unit 7 applies a predetermined decoding processing to the removing signal Sp, from which the cross talk is removed, generates a reproducing signal Sout in response to the information, which is recorded in an optical disk, to output the generated signal Sout to an outside monitor device or a speaker or the like (not illustrated).

Next, a detailed structure and the operation of the signal processing unit 6 for performing the cross talk removing processing according to the present invention will be explained with reference to FIG. 2.

As shown in FIG. 2, the signal processing unit 6 according to the embodiment is comprised of: delay circuits 11 and 12, of which delay amount is fixed; variable delay circuits 13 and 14 as a delay device, of which delay amount is variable; filters 15 and 16 as a filter device; coefficient setting units 17 and 18 as coefficient setting device; a CPU 19 as a delay amount controlling device, a difference calculating device, a first calculating device, a second calculating device, a multiplying device and an adding device; and an subtracter 30 as a removing device.

Next, the detailed operation will be explained.

At first, the digital detected signals Sdm, Sdb1 and Sdb2, which are input in the signal processing unit 6, are input in the delay circuits 11 and 12, the filter 16 and the coefficient setting unit 18, respectively.

Therefore, the delay circuit 11 delays the digital detected signal Sdb1 by a predetermined and fixed delay amount D1 and generates a delay detected signal Sd1 to output it to the variable delay circuit 13.

In parallel with this, the delay circuit 12 delays the digital detected signal Sdm by a predetermined and fixed delay amount D0 and generates a delay detected signal Sd to output it to the variable delay circuit 14.

In this case, the delay amounts D1 and D0 in respective delay circuits 11 and 12 are fixedly set in advance as the delay amount in order to delay the digital detected signal Sdb1 and the digital detected signal Sdm so that a line connecting respective optical spots and the moving (rotating) direction of the optical disk DK are orthogonal each other for processing a signal on the basis of the above digital detected signal Sdb2 corresponding to the optical spot SP2, when it is assumed that both of the spacing between the optical spot SPM and the optical spot SP1 and spacing between the optical spot SPM and the optical spot SP2, which are respectively shown in FIG. 1, are equal and fixed (in other words, this case corresponds to a conventional technology in the present invention).

Next, the variable delay circuit 13 adjusts the delay amount in the delay detected signal Sd1 in association with variance in respective spacing between the above described respective optical spots on the basis of a control signal Scd1 from the CPU 19 to be described later, generates an adjusted detected signal Svd1 and outputs it to the filter 15 and the coefficient setting unit 17.

Then, the coefficient setting unit 17 sets the filter coefficients to be multiplied in respective multipliers to be described later in the filter 15, respectively, on the basis of the removing signal Sp and the adjusted detected signal Svd1 to be described later. After that, the coefficient setting unit 17 gathers up these filter coefficients to generate a setting signal Spc1 and outputs it to the filter 14 and the CPU 19.

In this time, the coefficient setting unit 17 detects errors between respective ideal sample values in the removing signal Sp as a digital signal and respective ideal sample values, which can be taken as these sample values and are set in advance. Then, the coefficient setting unit 17 updates and sets the above respective filter coefficients so as to converge these errors to "0".

More specifically, for example, in three continuous sample value rows in the above removing signal Sp, a center sample value when these values shift from positive to negative or from negative to positive, namely, a zero cross sample is extracted, an error which this zero cross sample has with respect to an actual "0" value is detected and the above respective filter coefficients are updated and set so as to converge this error to "0".

Therefore, the filter 15 artificially obtains the cross talk in association with the sub truck ST1, which is mixed in the digital detected signal Sdm by reason that a portion of the optical spot SPM is involved with the sub truck ST1, by using the set respective filter coefficients, and generates a cross talk signal Sf1 to output it to the subtracter 30.

In parallel with this, the variable delay circuit 14 adjusts the delay amount in the delay detected signal Sd in association with variation in respective spacing between the above respective optical spots on the basis of a control signal Scd to be described later from the CPU 19, generates an adjustment detected signal Svd and outputs it to the subtracter 30.

Further, the coefficient setting unit 18, in which the digital detected signal Sdb2 is input, sets the filter coefficients to be multiplied in respective multipliers to be described later in the filter 16 on the basis of a removing signal Sp and digital detected signal Sb2 to be described later, respectively. Then, the coefficient setting unit 18 gathers up these filter coefficients and output it to the filter 16 as the digital detected signal Sdb2.

In this case, the coefficient setting unit 18, as well as the above coefficient setting unit 17, detects errors between respective sample values in the above removing signal Sp and respective ideal sample values, which can be takes as these respective sample values and are set in advance. Then, the coefficient setting unit 18 updates and sets the above respective filter coefficients so as to converge these errors to "0".

Therefore, the filter 16 artificially obtains the cross talk in association with the sub truck ST2, which is mixed in the digital detected signal Sdm by reason that a portion of the optical spot SPM is involved with the sub truck ST2, by using the set respective filter coefficients, and generates a cross talk signal Sf2 to output it to the subtracter 30.

Then, the subtracter 30 subtracts the cross signals Sf1 and Sf2 from the adjustment detected signal Svd, respectively, and generates the above removing signal Sp, of which cross talk is removed to output it to the coefficient setting units 17 and 18 and the decoding processing unit 7.

In parallel with these operations, the CPU 19 generates the above control signals Scd1 and Scd and outputs them to the variable delay circuits 13 and 14, respectively, so as to appropriately control the delay amount in the digital detected signals Sdb1 and Sdm on the basis of the digital detected signal Sdb2, namely, so as to control the delay amount in the variable delay circuits 13 and 14 so that this delay amount comprises the delay amount for orthogonalizing the moving (rotating) direction of the optical disk DK and the line connecting the irradiation center points of the main beam M, the sub beams S1, and S2 for processing the signals (i.e., apparently).

In this case, if an error $\Delta d$ of the delay amount occurs in a direction that a phase is progressing, the control signal Scd has a content for further delaying the delay detected signal Sd by $\Delta d$. On one hand, the control signal Scd1 has a content for further delaying the delay detected signal Sd1 by $2 \times \Delta d$.

On the other hand, if the error $\Delta d$ occurs in a direction that a phase is delaying, the control signal Scd has a content for further progressing the delay detected signal Sd by $\Delta d$. On one hand, the control signal Scd1 has a content for further progressing the delay detected signal Sd1 by $2 \times \Delta d$.

Next, detailed structures and the operations of the variable delay circuits 13 and 14 in the signal processing unit 6 will be explained with reference to FIG. 3.

FIG. 3 is a block diagram for illustrating detailed structures of the variable delay circuits 13 and 14. Additionally, in the variable delay circuit 13 and the variable delay circuit 14, the delay amounts on the basis of the control signal Scd1 or the control signal Scd are only different and the detailed structures thereof are the same, so that on behalf of these variable delay circuit 13 and the variable delay circuit 14, only the variable delay circuit 13 will be explained below.

As shown in FIG. 3A, the variable delay circuit 13 according to the embodiment is comprised of a shift register 25 having nth number of levels, a selector 26 and an inverter 27.

Next, the operation of the variable delay circuit 13 according to the embodiment will be explained by using FIG. 3B. Additionally, in the following explanation, a case that the above n is "8" will be explained as an example.

At first, the shift register 25 temporally holds the input delay detected signal Sd1, delays this delay detected signal Sd1 by one reference clock in reference clocks to be used for the reproducing processing of the information reproducing apparatus S and outputs the delay detected signal Sd1 to the selector 26 as register signals Sr1, Sr2, . . . , Sr8, respectively, Then, on the basis of the above control signal Scd1, the selector 26 outputs a register signal having the delay amount corresponding to the delay amount ($2\Delta d$), which is represented by the control signal Scd1, among respective register signals Sr1, Sr2, . . . , Sr8 to the delay circuit 15 as the above adjusted detected signal Svd1.

More specifically, as shown in FIG. 3B, the above control signal Scd1 comprising three bits of the control signals Scd10 to Scd12 (it becomes "−4" to "3" as a value, in the case of using two's complement) is converted into straight indication in the selector 26. In this case, the control signal Scd12 is input in the selector 26 after it is bit-reversed to be the control signal Scd12i in the inverter 27 so as to start the second bit in the bit indication from "0". Alternatively, in this case, the selector 26 functions as a multiplexer. Then, in response to this converted value, the selector 26 selects any register signal as shown in FIG. 3B and outputs it to the delay circuit 15 as the above adjusted detected signal Svd1. Alternatively, if the $\Delta d$ is 0 in this case, the delay amount to be output from the selector 26 (i.e., a value of the adjusted detected signal Svd1) becomes a neutral point (namely, a point where the delay amount is zero) in the delay changeable range of the variable delay circuit 13.

In this case, the variable delay circuit 13 having a structure shown in FIG. 3 is capable of controlling the delay amount in units of one reference clock.

Next, the detailed structures of the filters 15 and 16 and the generating processing of the cross talks signals Sf1 and Sf2 in the the filters 15 and 16 will be explained with reference to FIGS. 4 and 5.

Additionally, the cross talks 15 and 16 have the same structures and the same operations each other, so that on behalf of these cross talks 15 and 16, only the cross talk 15 will be explained below.

As shown in FIG. 3, the filter 15 is configured by so-called FIR digital filter. Specifically, it is comprised of (2n+1) pieces of delaying devices $20 \pm n$, (2n+1) pieces of multipliers $21 \pm n$, which are provided in association with respective delaying devices $20 \pm n$, respectively and an adder 22.

Then, the operation thereof will be explained below.

At first, each of the delaying devices $2 \pm n$ delays the input adjusted detected signal Svd1 (in the case of the delaying device 20−n) or the delay signals S in (in the case of the delaying devices 20−(n−1) to 20n) by one reference clock in the reference clocks to be used for the playing processing of the information play apparatus S, respectively, and generates the delay signal $S \pm n$ to output it to a next level of the delaying devices $20 \pm (n-1)$.

Next, the multipliers $21 \pm n$ multiply the above described filter coefficients a ($\pm n$) included in the above setting signal Spc1, respectively, with respective delay signals $S \pm n$ or the adjusted detected signal Svd1, generate multiplied signals Sa ($\pm n$), respectively, and output them to the adder 22.

Then, the adder 22 adds all of (2n+1) pieces of the above multiplied signals Sa ($\pm n$), generates the above cross talk signal Sf1 and outputs it to the above subtracter 30.

For example, as shown in FIG. 5 (showing a case that n is changed from −7 to +7), if sample timings "−7" to "+7" in association with respective filter coefficients are place on the sub truck ST1 as a sample timing on a radius of the sub truck ST1, in which a center C of the optical spot SPM is included, is a timing "0", it is generally known that each of respective filter coefficients a ($\pm n$) in association with respective sample timings indicates a converted value (an artificial converted value) of the cross talk in association with the sub truck ST1, which is mixed in the digital detected signal Sdm, by the reason that a portion of the optical spot SPM is involved with the sub truck ST1.

In this case, a general property of the above descried respective filter coefficients a (±n) assumes that the delay amount in the digital detected signal Sdb1 or the digital detected signal Sdbm on the basis of the digital detected signal Sdb2 is appropriate. Accordingly, in the case that the delay amount in the digital detected signal Sdb1 or the digital detected signal Sdm is not appropriate, as shown in FIG. 6, respectively, a peak value in the change of time of the filter coefficients a (±n) is displaced to the filter coefficients a (±n) before and after of the filter coefficient a (0) More specifically, in the case that the delay amount is short by one reference clock, as shown in an upper drawing of FIG. 6, the filter coefficient a (−1) takes the maximum value and in the case that the delay amount is appropriate, as shown in a middle drawing of FIG. 6 (as same as the upper drawing of FIG. 5), the filter coefficient a (0) takes the maximum value. Further, if the delay amount is excess by one reference clock, as shown in a lower diagram of FIG. 6, the filter coefficient a (+1) takes the maximum value.

Therefore, according to the present invention, by judging which filter coefficient has the maximum value in the change of this filter coefficients a (±n) other than the filter coefficient a (0) by the CPU 19, the delay amount in the variable delay circuit 13 or 14 is controlled so as to make the delay amount appropriate.

More specifically, with respect to the change of the filter coefficients a (±n), shown by the setting signal Spc1, for example, in the case that the filter coefficient a (−1) becomes the maximum value, it is judged that the above error Δd occurs so that the delay amount is short by one reference clock, the above control signals Scd1 and Scd2 are generated so that the delay amounts in the variable delay circuits 13 and 14 progress by one reference clock, respectively, and the control signals Scd1 and Scd2 are output to the variable delay circuits 13 and 14, respectively. Alternatively, in the case that the filter coefficients a (+1) becomes the maximum value, it is judged that the above error Δd occurs so that the delay amount is excess by one reference clock, the above control signals Scd1 and Scd2 are generated so that the delay amounts in the variable delay circuits 13 and 14 are delayed by one reference clock, respectively, and the control signals Scd1 and Scd2 are output to the variable delay circuits 13 and 14, respectively.

As described above, according to the operation of the signal processing unit 6 of the embodiment, on the basis of the change of a plurality of filter coefficients a (±n), the delay amounts for respective digital detected signals Sdb1 and Sdm are controlled. Therefore, even if the irradiation manner of the optical beam to be irradiated to respective trucks (more specifically, beam spacing) is changed, it is possible to accurately control the delay amount and delay respective digital detected signals Sdb1 and Sdm.

Alternatively, the delay amount is controlled on the basis of a plurality of filter coefficients a (±n) in the FIR filter, so that it is possible to accurately control the delay amount with a simple structure. Additionally, by accurately controlling the delay amount for respective digital detected signals Sdb1 and Sdm, it is possible to accurately remove the cross talk in the digital detected signal Sdm.

Further, it is possible to accurately perform the reproducing processing by using the digital detected signal Sdm, of which cross talk is accurately removed.

Alternatively, in the case of appropriately controlling the delay amount by the CPU 9, for example, looking upon a value obtained by multiplying a predetermined coefficient C with a value obtained by adding all of differences (a (+i)−a (−i) (i is a natural number not more than n) between the corresponding filter coefficients a (±n) on the basis of positive and negative of codes as the above error Δd, the delay amount in the valuable delay circuits 13 and 14 may be controlled.

In this case, the delay amount is controlled on the basis of differences between the filter coefficients a (±n), which are symmetrical to a time axis, so that it is possible to accurately control the delay amount.

Further, the delay amount is controlled on the basis of a value obtained by adding a plurality of differences between the filter coefficients a (±n), which are symmetrical to a time axis, so that it is possible to more accurately control the delay amount.

Alternatively, looking upon a value obtained by adding values obtained by multiplying the value obtained by multiplying the corresponding sample number i with the filter coefficient a (i) (i is a natural number not less than −n to not more than n) with a predetermined coefficient C' for all filter coefficients a (i) as the above error Δd, the delay amount in the valuable delay circuits 13 and 14 may be controlled.

In this case, on the basis of a value obtained by adding a value obtained by multiplying respective filter coefficients a (±n) with the corresponding sample numbers for all filter coefficients a (±n), the delay amount is controlled, so that it is possible to more accurately control the delay amount.

Alternatively, in the case of simply controlling the delay amount, a value obtained by multiplying the differences between the filter coefficients a (±n) in association with a specific sample timing (for example, a (+3)−a (−3)) with the above coefficient C may be looked upon as the error Δd.

Further, a value obtained by multiplying the above coefficient C with a value obtained by adding the differences between the filter coefficients a (±n) in association with a specific sample timing (for example, [a (+2)−a (−2)]+[a (+5)−a (−5)]) may be looked upon as the error Δd.

In this case, the delay amount is controlled on the basis of a value obtained by adding the differences of the filter coefficients a (±n), which are symmetrical to a time axis, so that an error of the delay amount is detected in a wide range and it is possible to accurately control the delay amount.

Additionally, according to the above described embodiment, the adjacent trucks are defined as the main truck MT and the sub trucks ST1 and ST2. However, other than these adjacent trucks, defining the trucks separated from the main truck MT by some trucks as the sub trucks ST1 or ST2, the above cross talk removing processing May be performed.

(II) A Modified Embodiment

Figure 7:
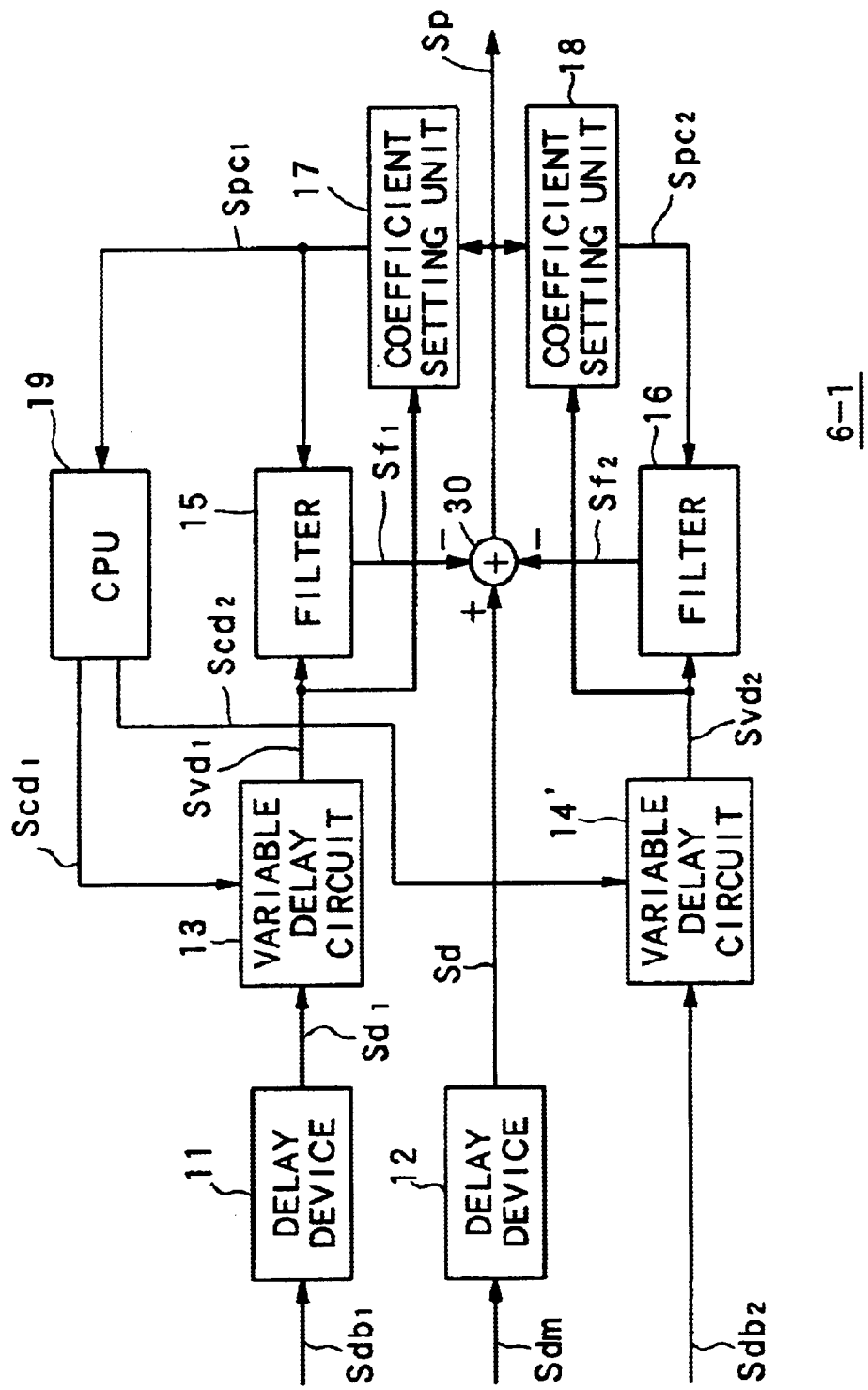
FIG. 7 is a block diagram for illustrating a schematic structure of a signal processing unit according to the embodiment of the present invention.

Next, a modified embodiment according to the present invention will be explained with reference to FIG. 7. In FIG. 7 to be described below, the same components as those in FIG. 2 according to the embodiment are provided with the same reference numerals and the explanation thereof are herein omitted.

The present invention can be applied in the signal processing unit having a structure other than the signal processing unit 6 according to the above described embodiment.

In other words, as shown in FIG. 7, which is a block diagram for illustrating a schematic structure of a signal processing unit $6_{-1}$ according to the modified embodiment, in place of the variable delay circuit 14 according to the embodiment, a variable delay circuit 14' (having the same structure as the variable delay circuit 13 or 14 according to the embodiment), which delays the digital detected signal Sdb2 as looking upon this signal as variable on the basis of a control signal Scd2 from the CPU 23, may be used.

In this case, with respect to the delay amounts in the variable delay circuits 13 and 14', in the case that the delay amount in the variable delay circuit 13 is defined as Δd, the delay amount in the variable delay circuit 14' is controlled while maintaining a relation that the delay amount is Δd.

Alternatively, according to the above described embodiment, the delay amount in the variable delay circuits 13 and 14 are controlled only on the basis of the filter coefficient, which is set in the coefficient setting unit 17. According to the other modified embodiment other than the above modified embodiment, by using a filter coefficient set in another coefficient setting unit 18, it is possible to control the delay amount in the variable delay circuits 13 and 14.

In this case, the calculation processing, which is set in advance, is separately and similarly applied to the filter coefficients, which are set in the coefficient setting unit 17, and the filter coefficients, which are set in the coefficient setting unit 18, respectively. Then, the differential value between the results obtained from this calculation processing are output to the CPU 19 and the CPU 19 uses this differential value to generate the above control signals Scd1 and Scd2.

Further, according to the above described embodiment, a case is explained such that the present invention is applied for controlling the delay amount in the cross talk removing processing by the used of the three beam system. However, other than this, for example, the present invention may be applied to the delay amount control in the cross talk removing processing by the use of truck memory system or so-called imaging system (a detector separation system).

Additionally, according to the above described embodiment and modified embodiments, a case is explained such that the present invention is applied to the information playing apparatus S for playing the information, which is recorded in the optical disk DK. However, other than this, the present invention may be applied to a case of accurately detecting the recording control information by the information recording apparatus for detecting the recording control information (for example, the address information or the like for indicating a recording position of the information to be recorded), which is recorded in the optical disk can be recorded in advance, and recording the necessary information in the optical disk on the basis of the detected recording control information.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-284220 filed on Sep. 19, 2000 including the specification, claims, drawings and summary is incorporated herein by reference in its entirety.

What is claimed is:

1. A signal delay apparatus for delaying at least one of a main detected signal, which is optically obtained from a main truck, in which the information to be detected is recorded, or a sub detected signal, which is optically obtained from a sub truck other than the main truck, comprising:

a filter device for generating a leakage signal, which is mixed in the main detected signal in association with the information, which is recorded on the sub truck, on the basis of a filter coefficient;

a coefficient setting device for generating the filter coefficient on the basis of the main detected signal, of which the leakage signal is removed, and the sub detected signal, and for outputting the generated filter coefficient to the filter device;

a delay amount controlling device for controlling the delay amount in the delay of any one of the main detected signal and the sub detected signal on the basis of the change in the filter coefficient, which is generated in a predetermined time period; and a delay device for delaying any one of the main detected signal and the sub detected signal by the controlled delay amount.

2. The signal delay apparatus according to claim 1, wherein, the signal delay apparatus comprises a plurality of filter devices for generating the plural leakage signals, which are mixed in the main detected signal, respectively, in association with the information, which are recorded on a plurality of and different sub trucks, respectively, on the basis of the filter coefficient;

the coefficient setting device generates the respective filter coefficients, respectively, on the basis of the main detected signal, of which the respective leakage signals are removed, respectively, and a plurality of sub detected signals in association with the respective sub trucks, and outputting generated filter coefficients to the corresponding filter device; and the delay amount controlling device controls the delay amount in the delay of any one of the main detected signal and the sub detected signal on the basis of the change in the respective filter coefficients, which are generated in the time period with respect to the plural sub trucks.

3. The signal delay apparatus according to claim 1, wherein, the filter device is a digital filter device for digitally detecting the leakage signal, the digital filter device further comprises a difference calculating device for calculating the difference between a plurality of tap coefficients and the delay amount controlling device controls the delay amount on the basis of the calculated difference.

4. A signal delay apparatus according to claim 3, wherein, the difference calculating device calculates the difference between the Nth (N is a natural numeral) tap coefficient and the −Nth tap coefficient; and the delay amount controlling device controls the delay amount on the basis of the calculated difference.

5. The signal delay apparatus according to claim 3, wherein, the difference calculating device comprises a first calculating device for calculating a first difference, which is a difference between the Nth (N is a natural numeral) tap coefficient and the −Nth tap coefficient;

and a second calculating device for calculating a second difference, which is a difference between the Mth (M is a natural numeral and M is not equal to N) tap coefficient and the −Mth tap coefficient; and the delay amount controlling device controls the delay amount on the basis of sum of the first difference and the second difference.

6. The signal delay apparatus according to claim 3, wherein, the difference calculating device calculates a difference between the Nth (N is a natural numeral) tap coefficient and the −Nth tap coefficient; and the delay amount controlling device controls the delay amount on the basis of a value obtained by adding the calculated difference to a predetermined number of the tap coefficients.

7. The signal delay apparatus according to claim 3, wherein the digital filter device comprises a FIR (Finite Impulse Response) filter.

8. The signal delay apparatus according to claim 1, wherein, the filter device comprises a digital filter device for digitally detecting the leakage signal; and the delay amount controlling device comprises; a multiplying device for multiplying respective tap coefficients in the digital filter device with a lapsed time from a predetermined standard time at a sample timing in association with the respective tap coefficients and for calculating the multiplied values, respectively, and an adding device for adding the multiplied values, which are calculated for the all tap coefficients, and for calculating added values, wherein the delay amount controlling device controls the delay amount on the basis of the calculated added value.

9. A leakage signal removing apparatus for removing a leakage signal from a main detected signal by using detected signals, which are delayed by a delaying device in a signal delay apparatus for delaying at least one of the main detected signal, which is optically obtained from a main truck, in which the information to be detected is recorded, or a sub detected signal, which is optically obtained from a sub truck other than the main truck, the signal delay apparatus comprising:

a filter device for generating a leakage signal, which is mixed in the main detected signal in association with the information, which is recorded on the sub truck, on the basis of a filter coefficient;

a coefficient setting device for generating the filter coefficient on the basis of the main detected signal, of which the leakage signal is removed, and the sub detected signal, and for outputting the generated filter coefficient to the filter device;

a delay amount controlling device for controlling the delay amount in the delay of any one of the main detected signal and the sub detected signal on the basis of the change in the filter coefficient, which is generated in a predetermined time period; and a delay device for delaying any one of the main detected signal and the sub detected signal by the controlled delay amount.

10. An information processing apparatus comprising:

(i) a leakage signal removing apparatus for removing a leakage signal from a main detected signal by using detected signals, which are delayed by a delaying device in a signal delay apparatus for delaying at least one of the main detected signal, which is optically obtained from a main truck, in which the information to be detected is recorded, or a sub detected signal, which is optically obtained from a sub truck other than the main truck, the signal delay apparatus comprising:

a filter device for generating a leakage signal, which is mixed in the main detected signal in association with the information, which is recorded on the sub truck, on the basis of a filter coefficient;

a coefficient setting device for generating the filter coefficient on the basis of the main detected signal, of which the leakage signal is removed, and the sub detected signal, and for outputting the generated filter coefficient to the filter device;

a delay amount controlling device for controlling the delay amount in the delay of any one of the main detected signal and the sub detected signal on the basis of the change in the filter coefficient, which is generated in a predetermined time period; and a delay device for delaying any one of the main detected signal and the sub detected signal by the controlled delay amount, and (ii) a processing device for performing at least one of recording the information in the main truck on the basis of the main detected signal, of which the leakage signal is removed, or playing the information.

* * * * *